(12) United States Patent
Casey et al.

(10) Patent No.: US 7,731,614 B2
(45) Date of Patent: Jun. 8, 2010

(54) METHOD AND APPARATUS FOR AN ELECTRIC DRIVE DIFFERENTIAL SYSTEM

(75) Inventors: Kent A. Casey, Washington, IL (US); James E. Winzeler, East Peoria, IL (US)

(73) Assignee: Caterpillar Inc., Peoria, IL (US)

( * ) Notice: Subject to any disclaimer, the term of this patent is extended or adjusted under 35 U.S.C. 154(b) by 0 days.

(21) Appl. No.: 10/295,089

(22) Filed: Nov. 15, 2002

(65) Prior Publication Data

US 2003/0203782 A1    Oct. 30, 2003

Related U.S. Application Data

(60) Provisional application No. 60/376,355, filed on Apr. 29, 2002.

(51) Int. Cl.
*B62D 11/10* (2006.01)

(52) U.S. Cl. .............................. 475/18; 475/21; 475/29

(58) Field of Classification Search .................. 475/18, 475/19, 29, 21, 30; 180/6.44
See application file for complete search history.

(56) References Cited

U.S. PATENT DOCUMENTS

| | | | |
|---|---|---|---|
| 1,984,830 A | 12/1934 | Higley | |
| 2,027,218 A * | 1/1936 | Armington | 74/664 |
| 4,357,840 A | 11/1982 | Winzeler | |
| 4,420,991 A * | 12/1983 | Meyerle | 475/23 |
| 4,423,644 A | 1/1984 | Coutant | |
| 4,430,908 A | 2/1984 | Stockton | |
| 4,784,232 A * | 11/1988 | Leboime | 180/6.2 |
| 4,960,404 A * | 10/1990 | Reppert et al. | 475/23 |
| 4,998,591 A * | 3/1991 | Zaunberger | 180/6.44 |
| 5,004,060 A * | 4/1991 | Barbagli et al. | 475/23 |
| 5,168,946 A * | 12/1992 | Dorgan | 180/6.44 |
| 5,195,600 A | 3/1993 | Dorgan | |
| 5,387,161 A | 2/1995 | Shibahata | |
| 5,415,595 A | 5/1995 | Nelson | |
| 5,445,234 A * | 8/1995 | Hall, III | 180/6.44 |
| 5,509,491 A * | 4/1996 | Hall, III | 180/6.44 |
| 5,620,387 A | 4/1997 | Janiszewski | |
| 5,637,048 A | 6/1997 | Maeda et al. | |
| 5,851,162 A | 12/1998 | Tether | |
| 5,884,526 A | 3/1999 | Fogelberg | |
| 5,919,109 A * | 7/1999 | Fleckenstein | 475/151 |
| 6,024,182 A | 2/2000 | Hamada et al. | |
| 6,098,737 A | 8/2000 | Aoki | |
| 6,125,953 A | 10/2000 | Arai et al. | |
| 6,165,094 A | 12/2000 | Williams | |
| 6,401,850 B1 | 6/2002 | Bowen | |

(Continued)

FOREIGN PATENT DOCUMENTS

JP    08-282314    10/1996

*Primary Examiner*—Sherry Estremsky
(74) *Attorney, Agent, or Firm*—Steven M. Hanley

(57) ABSTRACT

A differential assembly includes an electrically operated input device and a first planetary assembly in driving engagement with the input device. The first planetary assembly is drivingly connected to a first output assembly. A second planetary assembly is in driving engagement with the first planetary assembly and the second planetary assembly is drivingly connected to a second output assembly. The first planetary assembly co-acts with the second planetary assembly to provide substantially the same torque to the first and second output assemblies and the first and second planetary assemblies include axes of rotation substantially aligned with an axis of rotation of the input device.

23 Claims, 9 Drawing Sheets

U.S. PATENT DOCUMENTS

| | | | |
|---|---|---|---|
| 6,470,983 B1 * | 10/2002 | Amano et al. | 180/65.2 |
| 6,478,706 B1 * | 11/2002 | Crabb | 475/18 |
| 6,491,599 B1 * | 12/2002 | Schmidt | 475/5 |
| 6,749,532 B2 * | 6/2004 | Wachauer | 475/5 |
| 2004/0069542 A1 * | 4/2004 | Simmons et al. | 180/6.2 |

* cited by examiner

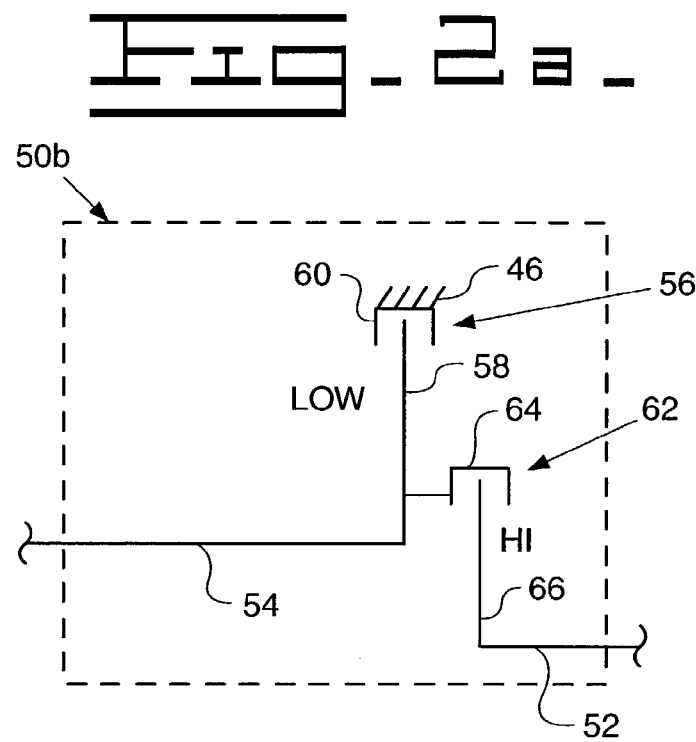
Fig_2a_
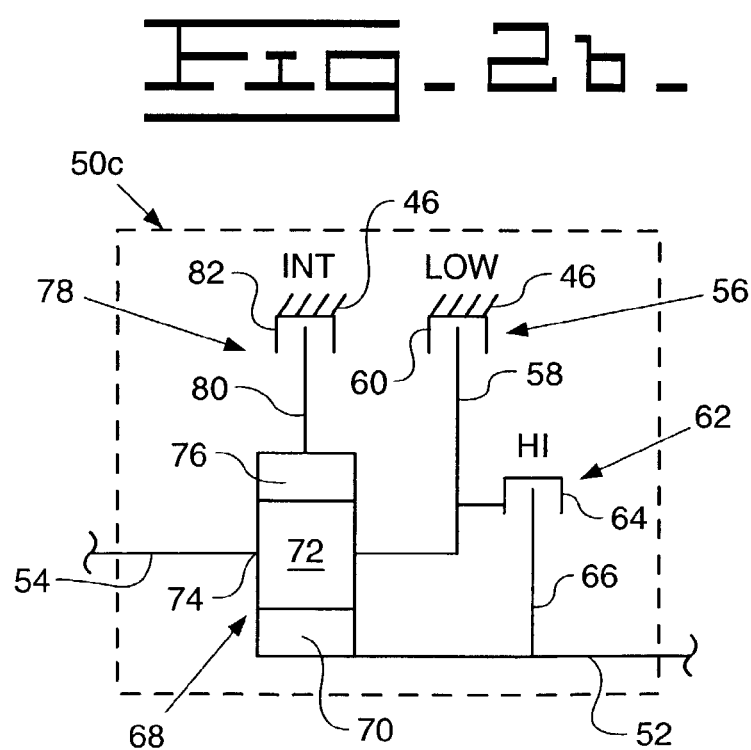
Fig_2b_

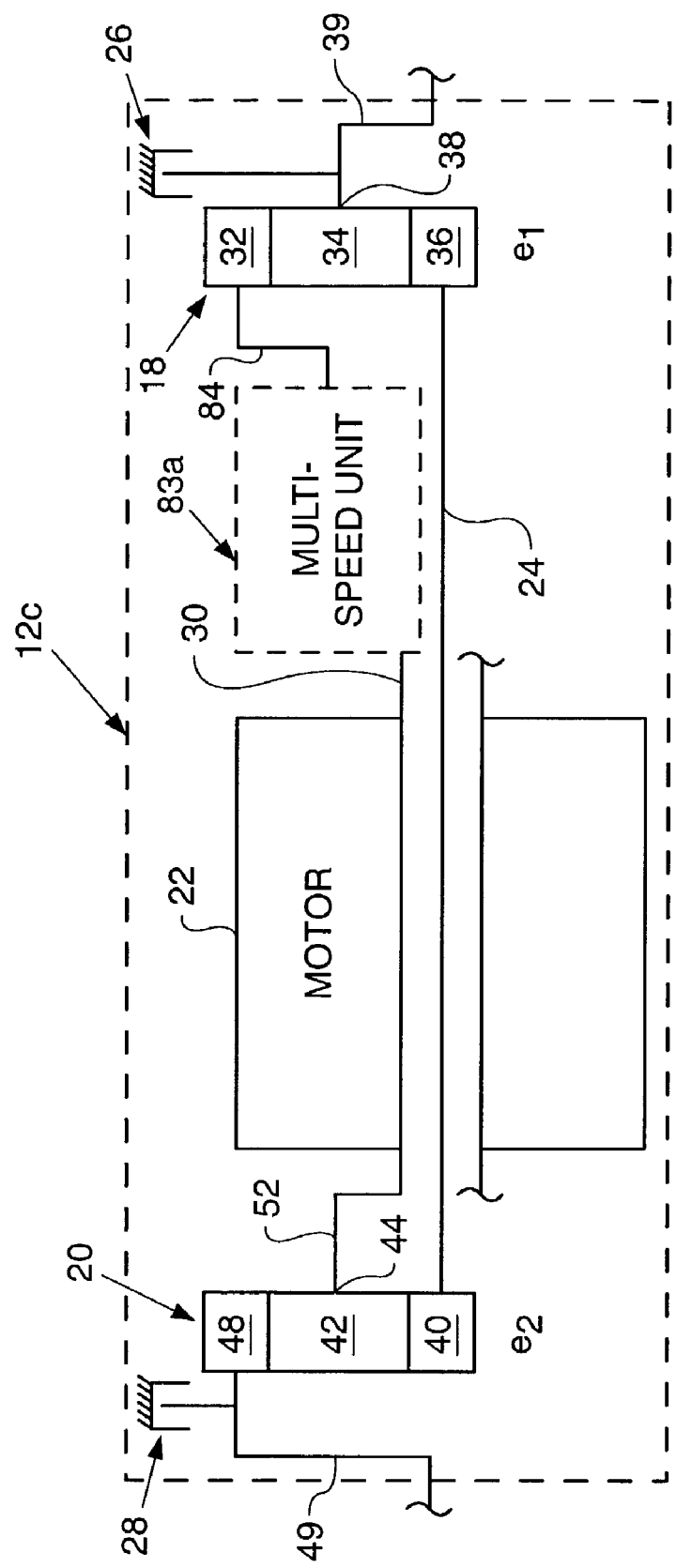

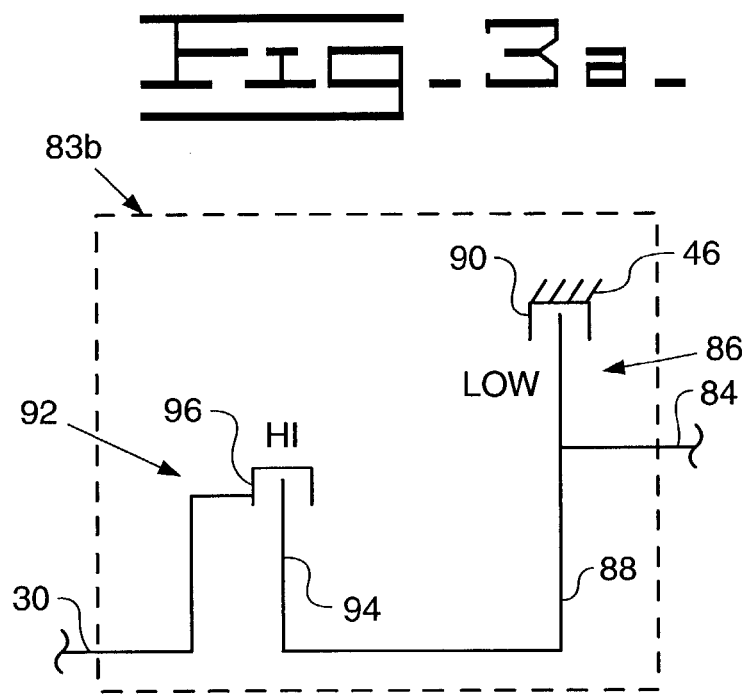
Fig_3a_
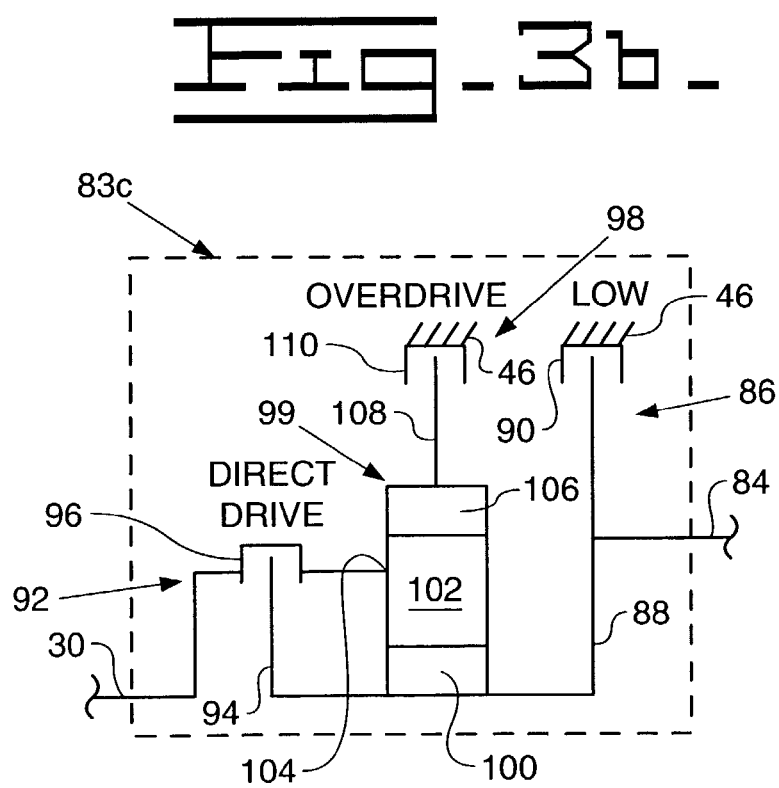
Fig_3b_

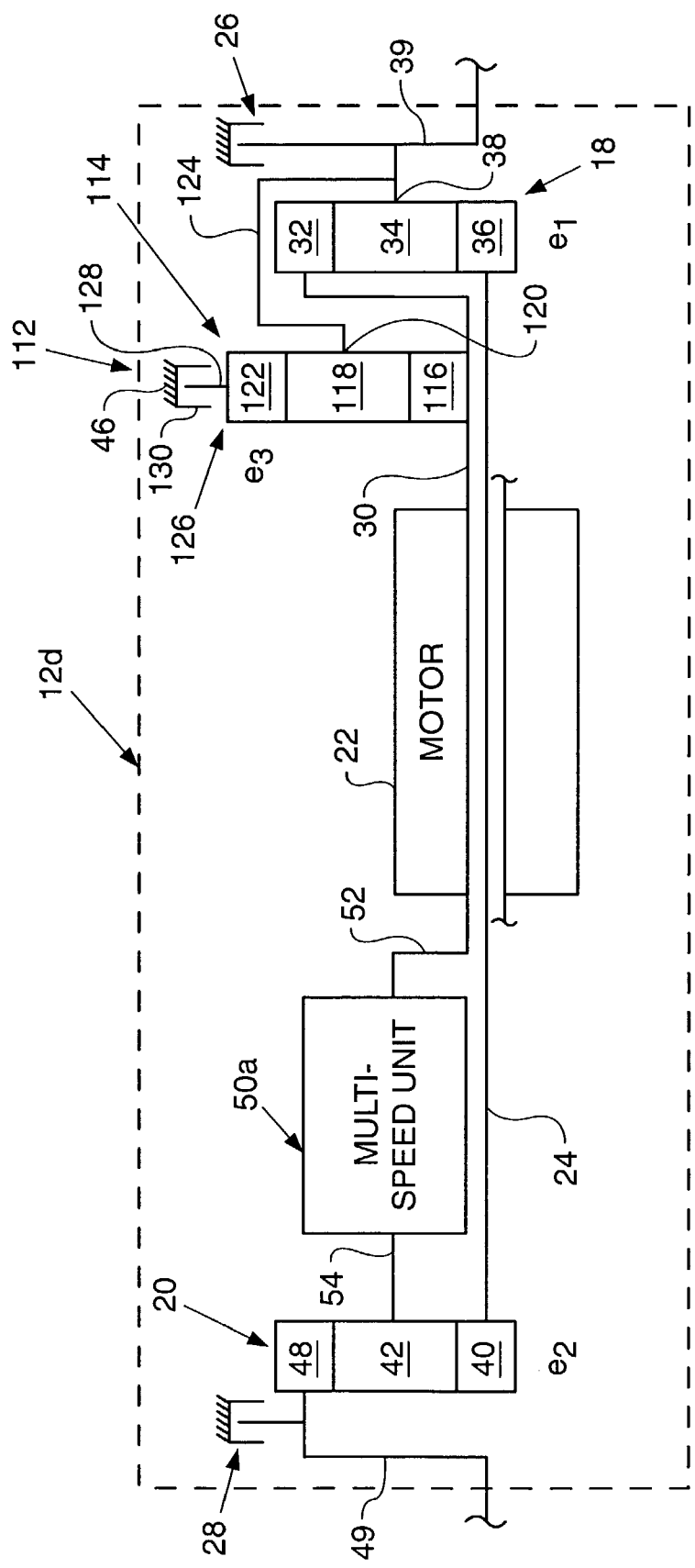

METHOD AND APPARATUS FOR AN ELECTRIC DRIVE DIFFERENTIAL SYSTEM

This application claims the benefit of prior provisional patent application Ser. No. 60/376,355 filed Apr. 29, 2002.

TECHNICAL FIELD

The present invention relates generally to a differential to transmit output torque between a pair of output assemblies, and more particularly to a differential having a single electric input.

BACKGROUND

It is known to employ a pair of planetaries to provide differential drive respectively to a pair of output assemblies such as ground engaging wheels or a continuous belt or track. The planetaries may be arranged such that their respective sun gears are driven by a common drive member or shaft. The main drive source, typically a drive shaft propelled by an internal combustion engine, may be in mesh with a ring gear of one of the planetaries through multiple gear assemblies to provide directionality and gear reduction. Typically, the drive source includes a rotational axis perpendicularly located relative the rotational axis of a driven axle or output which is commonly referred to as a "cross-drive". For example, U.S. Pat. No. 4,357,840 issued to Winzeler, having an issue date of Nov. 9, 1982 and U.S. Pat. No. 4,423,644 issued to Coutant, having an issue date of Jan. 3, 1984 which are assigned to the assignee of the present invention, show differential assemblies having a pair of planetary assemblies driven in a cross-drive orientation. In operation, the planetary assemblies are in continuous driving engagement through a common shaft.

However, electrically driven powertrain systems may provide additional advantages since the drive source has been integrated into the differential to desirably reduce losses caused by the cross-drive connection, in addition to providing a more compact powertrain assembly. Additionally, there are also significant cost benefits of such an integrated arrangement. For example, U.S. Pat. No. 5,620,387 issued to Janiszewski provides an electric motor driving an axle through multiple, stacked and interconnected assemblies including a two-speed reducer, a reduction planetary and a bevel-gear nest.

Moreover, differential assemblies, by nature, are configured to transfer torque substantially equally between the outputs. For example, on a ground-engaging machine the torque generated by the drive source is transported to the wheels. However, known differentials transmit torque to the wheels regardless of wheel speed and are thus prone to wheel slippage especially at low speeds. On construction machines such as a wheel loader, such wheel slippage is typical as the machine is maneuvered to fill its bucket, for example. If a wheel slips a portion of the traction may be lost corresponding to an inefficient operation. Such events are time consuming, and significantly increase the operational costs associated with increased fuel usage, increased machine maintenance and increased time to complete the required task.

Therefore, it is desired to provide an inexpensive and compact differential assembly which, when operated, exhibits a reduction in losses between the drive source and the final drive assemblies, and additionally does not include significantly expensive componentry. Further, it is desired to provide a differential which limits wheel slippage to increase efficiency and enhance maneuverability.

SUMMARY OF THE INVENTION

The present invention provides a differential assembly, including an electrically operated input device, a first planetary assembly and a second planetary assembly. The first planetary is in driving engagement with the input device and the first planetary assembly is drivingly connected to a first output assembly. The second planetary assembly is in driving engagement with the first planetary assembly and is drivingly connected to a second output assembly wherein the first planetary assembly co-acts with the second planetary assembly to provide substantially the same torque to the first and second output assemblies. The first and second planetary assemblies include axes of rotation substantially aligned with an axis of rotation of said input device.

The present invention further provides a differential assembly including an electrically operated input device, a first planetary assembly, a second planetary assembly and a differential lock assembly. The first planetary assembly is in driving engagement with the input device and is drivingly connected to a first output assembly. The second planetary assembly is in driving engagement with the first planetary assembly and is drivingly connected to a second output assembly. The differential lock assembly is operable to cause substantially similar rotational speed of said first and second output assemblies, wherein the first planetary assembly co-acts with the second planetary assembly to provide substantially the same torque to the first and second output assemblies and the first and second planetary assemblies include axes of rotation substantially aligned with an axis of rotation of the input device.

The present invention further provides a method to operate a differential assembly, the differential assembly including a pair of planetaries drivingly engaged through a reaction member and an input source configured to drive at least one of the pair of planetaries. Each of the pair of planetaries being in driving relationship with an output assembly. The method including: providing a differential lock mechanism configured to engage at least one of the planetary assemblies; and driving the output assemblies at substantially the same rotational speed in response to the differential lock assembly being engaged.

BRIEF DESCRIPTION OF THE DRAWINGS

The above-mentioned and other features of this invention, and the manner of attaining them, will become more apparent and the invention itself will be better understood by reference to the following description of the embodiments of the invention taken in conjunction with the accompanying drawings, wherein:

FIG. 2A is a schematic and diagrammatic view of a second embodiment of the multi-speed unit of FIG. 2 including two speed selections;

FIG. 2B is a schematic and diagrammatic view of a third embodiment of the multi-speed unit of FIG. 2 including three speed selections;

FIG. 3 is a schematic and diagrammatic view of a third embodiment of a differential assembly according to the present invention showing a first embodiment of a multi-speed unit;

FIG. 3A is a schematic and diagrammatic view of a second embodiment of the multi-speed unit of FIG. 3 including two speed selections;

FIG. 3B is a schematic and diagrammatic view of a third embodiment of the multi-speed unit of FIG. 3 including three speed selections;

FIG. 4 is a schematic and diagrammatic view of a fourth embodiment of a differential assembly according to the present invention showing a differential lock assembly;

DETAILED DESCRIPTION

Reference will now be made in detail to the exemplary embodiments of the invention, examples of which are illustrated in the accompanying drawings. Wherever possible, the same reference numbers will be used throughout the drawings to refer to the same or like parts and certain corresponding elements are indicated through an alphanumeric association.

Figure 1:
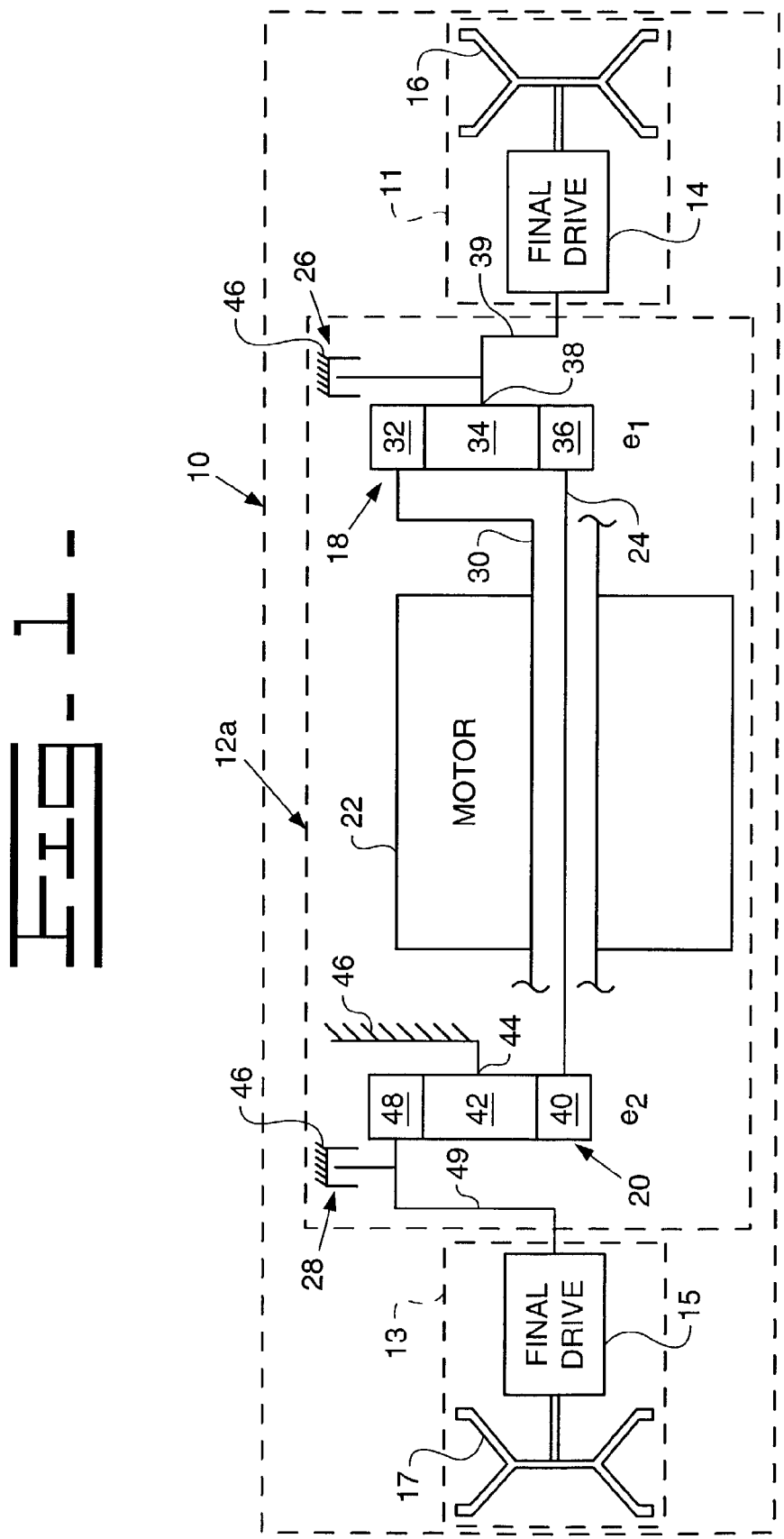
FIG. 1 is schematic and diagrammatic view of a first embodiment of a machine according to the present invention including a first embodiment of a differential assembly.

Referring to FIG. 1, a machine 10 is shown including a first embodiment of a differential assembly 12a attached thereto. The differential assembly 12a is in driving engagement with output assemblies 11, 13, which may be, for example, final drive assemblies 14, 15 in driving engagement with wheel assemblies 16, 17, respectively. The wheel assemblies 16, 17 may respectively propel ground-engaging tires as is customary. Although output assemblies 11, 13 are depicted as final drive and wheel assembly combinations, it is envisioned that the output assemblies 11, 13 may also be wheel assemblies without the final drive assemblies, continuous track or belt assemblies (with or without reduction gearing) or any other output assembly known to those having ordinary skill in the art. In the exemplary embodiment the final drive assemblies 14, 15 each provide a gear reduction between the differential 12a and the respective wheel assembly 16, 17. In an exemplary embodiment, each final drive assembly may be a planetary assembly providing a 5:1 gear reduction ratio, for example.

The differential assembly 12a, includes a first planetary assembly 18 and a second planetary assembly 20. The first planetary assembly 18 is driveably engaged by an electrically operated input device such as a motor 22, for example. The first planetary assembly 18 is also connected to the second planetary assembly 20 through a reaction member 24. The differential assembly 12a includes a pair of brake assemblies 26, 28, positioned between the respective planetary assembly and final drive assembly, which may be activated to slow the speed of the output assemblies and consequently decrease machine speed. The brake assemblies 26, 28 are mounted to a housing 46 or other load-supporting member as is customary. Additionally, the brake assemblies 26, 28 may co-act to prevent a significant difference in speed of the output assemblies which typically occurs when one of the output assemblies loses traction due to wheel or track slippage, for example.

The motor 22 is connected to a ring gear 32 of the first planetary assembly 18 through a drive member 30. In an exemplary embodiment, drive member 30 is a hollow drive shaft driven by motor 22 and reaction member 24 is a shaft which is extended through, and freely rotates within, the hollow shaft member 30. The first planetary assembly 18 also includes a planet gear set 34 and a sun gear 36. The planet gear set 34 is supported on a carrier 38 and, in turn, the carrier transmits output torque to the final drive assembly 14 through an output member 39. The sun gear 36 of the first planetary assembly 18 is connected to a sun gear 40 of the second planetary assembly 20 through the reaction member 24. Sun gear 40 of the second planetary assembly 20 is in mesh with the planet gear set 42 and the planet gear set 42 is in mesh with a ring gear 48. A ratio "$e_1$" represented by the number of teeth in the ring gear 32 over the number of teeth in the sun gear 36 may be 2:1, for example, for the first planetary assembly 18. Hence, the first planetary assembly 18 includes a ratio or $e_1$ value of 2. Similarly, the second planetary assembly 20 includes a ratio of $e_2$ equal to the number of teeth of the ring gear 48 over the number of teeth of the sun gear 40. The ratio $e_2$ of the second planetary assembly 20 is designed to be equal to the ratio $e_1$ of the first planetary assembly 18 plus one for proper differential action and equal torque provided to the first and second final drive assemblies 14, 15. The ratio $e_2$ may be 3 for example.

A carrier 44 is attached (e.g., "grounded") to a housing 46 of the differential assembly 12a so that the planet gear set 42 is prevented from orbiting about the sun gear 40. Consequently, rotation of the sun gear 40 causes direct rotation of the ring gear 48. The ring gear 48 is connected to the final drive 15 through a drive member 49 and, in turn, the wheel 17 is driven by the final drive 15. Notably, the carriers 38, 44 of the first and second planetary assemblies 18, 20 include axes of rotation which are coincident with a reference axis X. Further, in an exemplary embodiment, the respective axes of rotation of the motor 22, the final drives 14, 15 and the wheels 16, 17 are also coincident with the reference axis X. It will be understood that axial alignment of the motor, final drives and planetary assemblies provide for a direct connection and efficient transfer of torque from the motor to the wheels through the respective planetaries and final drives. Thus, by minimizing the reduction members and associated connections within the differential assembly 12a and through axial alignment of the rotating members, a compact differential assembly is formed and one in which the resultant gear losses are insubstantial.

Figure 2:
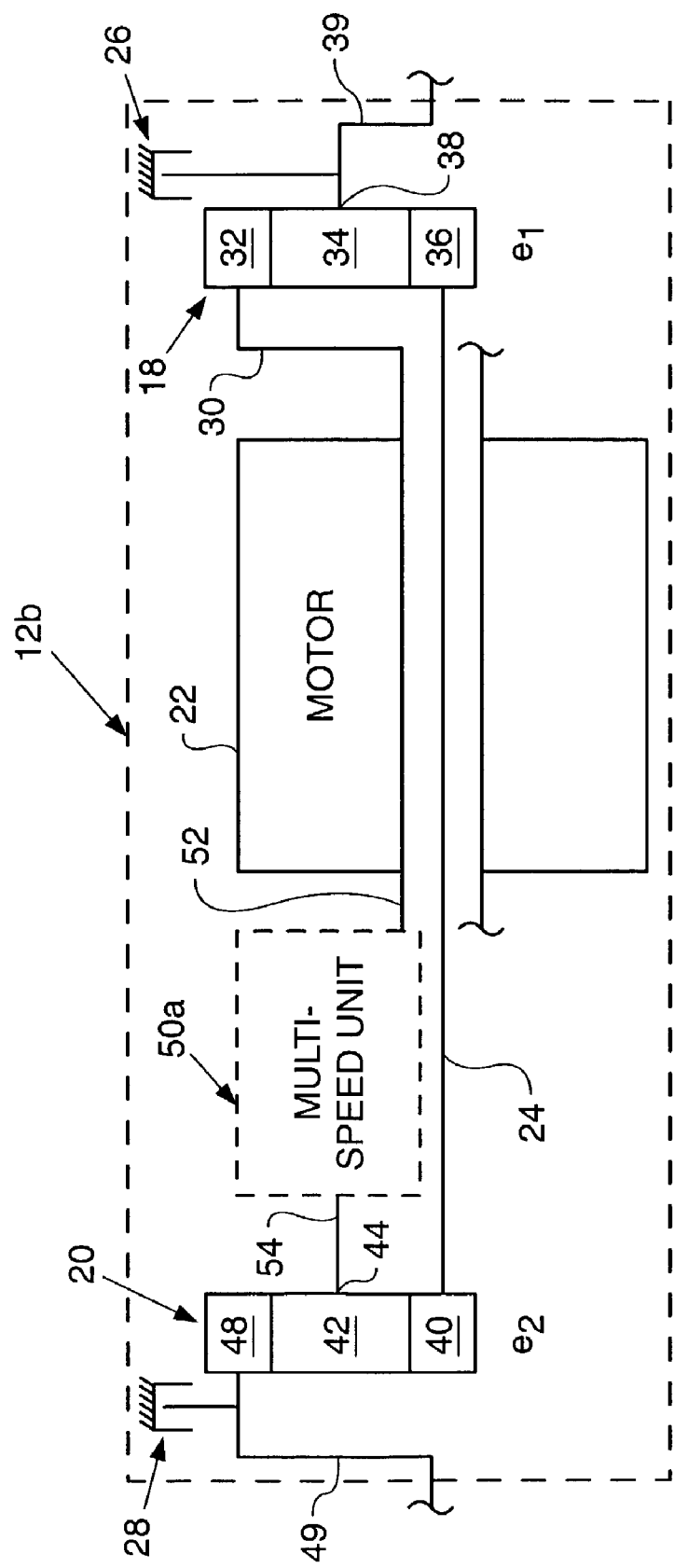
FIG. 2 is a schematic and diagrammatic view of a second embodiment of a differential assembly according to the present invention showing a first embodiment of a multi-speed unit.

Referring to FIG. 2, shown is a second embodiment of a differential assembly 12b and differs from the first embodiment differential assembly 12a (FIG. 1) in several aspects. One such aspect includes the differential assembly 12b including a multi-speed unit 50a to provide, inter alia, an infinite number of speed selections of the differential assembly 12b between zero and a maximum rated speed. The multi-speed unit 50a may be comprised of any selectively variable speed mechanism known to those having ordinary skill in the art. The multi-speed unit 50a is driven by the motor 22 through a drive member 52 and, in turn, an output member 54 transmits torque from the multi-speed unit 50a to the planet carrier 44 of the second planet assembly 20.

Referring to FIG. 2A, shown is a second embodiment of a multi-speed unit 50b which provides for two operational speeds (HI and LOW) of the differential assembly 12b. The two speed unit 50b includes a low speed clutch assembly 56 and a high-speed clutch assembly 62. The low speed clutch assembly 56 includes a rotating member 58 fixed to the output member 54 (FIG. 2) and a grounded member 60 which may be fixed to the housing 46. The rotating member 58 and the grounded member 60 become engaged, as is customary, when low speed differential operation is selected. The high-speed clutch assembly 62 includes a rotating member 66 connected to the drive member 52 and a driven member 64 attached to the output member 54. When the HI speed of the differential assembly 12b is selected, the rotating member 64 engages with the driven member 66 and the output member 54 is driven by the drive member 52.

Referring to FIG. 2B, shown is a third embodiment of a multi-speed unit 50c which provides for three operational speeds (HI, LOW and INT). The multi-speed unit 50c differs from the multi-speed unit 50b (FIG. 2A) in that a planetary assembly 68 is included and is positioned adjacent the low speed clutch assembly 56 to provide an intermediate speed between the LOW and HI speed selections. The planetary assembly 68 includes a sun gear 70 attached to drive member 52 of the motor 22, planet gears 72 and a ring gear 76. A carrier 74, supporting planet gears 72 of the planetary assembly 68, is connected to the output member 54. An intermediate speed clutch assembly 78, which is operable to engage the planetary assembly 68, includes a rotating member 80 and a grounded member 82. The rotating member 80, which may be a clutch plate for example, is fixed to the ring gear 76. In operation, activation of the clutch assembly 78 causes grounded member 82 and rotating member 80 to engage, which, in turn, causes ring gear 76 to become grounded with the housing 46. Consequently, the drive member 52 of the motor 22 drives output member 54 at an intermediate speed pursuant to the reduction provided by the intermediate speed clutch assembly.

Figure 6:
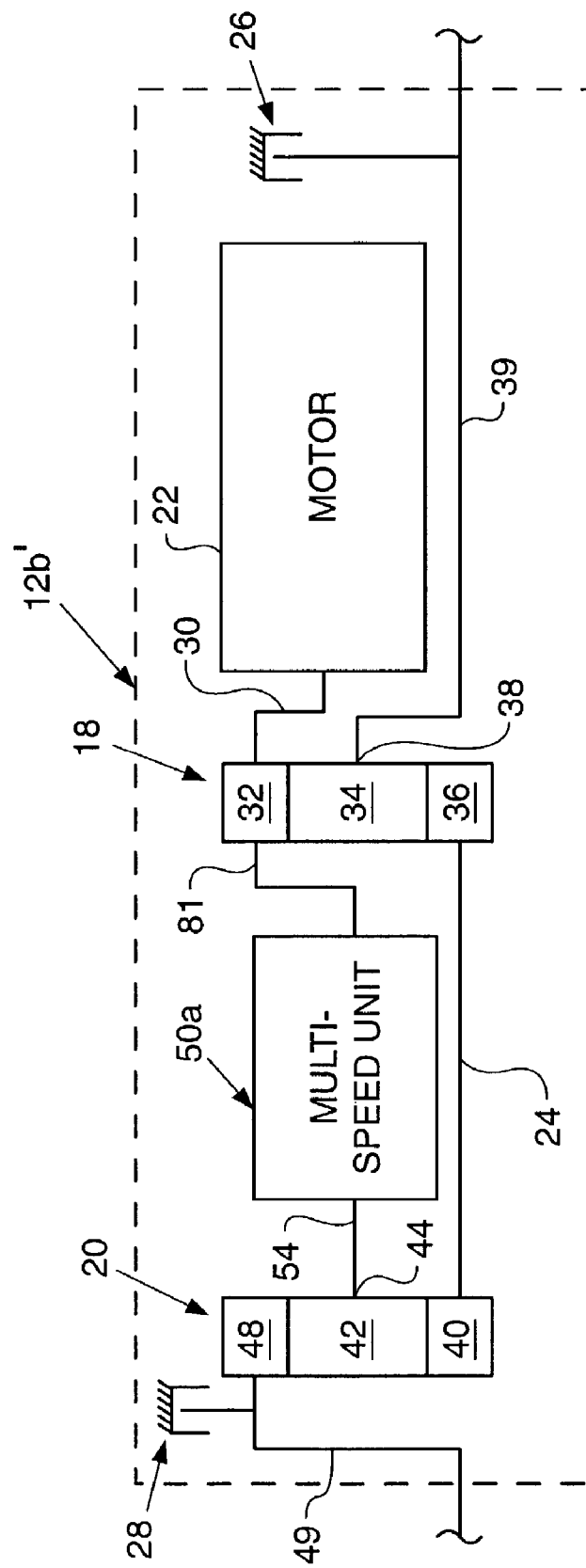
FIG. 6 is a schematic and diagrammatic view of a modified form of the differential assembly shown in FIG. 2.

Referring to FIG. 6 a modified embodiment of the differential assembly 12b is shown wherein certain corresponding elements are denoted by primed reference numerals. The differential assembly 12b' differs from the differential assembly 12b, inter alia, in that the motor 22 is positioned outside of the first planetary assembly 18. Moreover, rather than the motor being connected to both the multi-speed unit 50a and the ring gear 32 of the first planetary assembly 18, as is depicted in FIG. 2, the differential assembly 12b' provides a connection between the motor 22 and the ring gear 32 through the drive member 30. In turn the ring gear 32 is driving engagement with the multi-speed unit 50a through a member 81. It is contemplated that the motor 22 may be concentrically positioned about the output member 39 or the motor 22 may be offset, having an axis of rotation being parallel and offset relative to the output member 39. Yet another contemplated alternative includes the motor 22 positioned in a cross drive relationship with the ring gear 32 with the ring gear being connected to the motor through a bevel gear assembly, for example.

Referring to FIG. 3, shown is a third embodiment of a differential assembly 12c and differs from the second embodiment differential assembly 12b (FIG. 2) in that a multi-speed unit 83a is positioned between the motor 22 and the first planetary assembly 18. The multi-speed unit 83a is in driving engagement with the ring gear 32 of the first planetary assembly 18 through a drive member 84. The drive member 30, being driven by the motor 22, is connected to the multi-speed unit 83a. Similar to the multi-speed unit 50a of differential assembly 12b, the multi-speed unit 83a of the differential assembly 12c provides an infinite number of speed selections between zero and a maximum rated speed for the differential assembly 12c.

Referring to FIG. 3A, shown is a second embodiment of a multi-speed unit 83b, which provides for two operational speeds (HI and LOW) of the differential assembly 12c. The two-speed unit 83b includes a low speed clutch assembly 86 and a high-speed clutch assembly 92. The low-speed clutch assembly 86 includes a rotating member 88 fixed to the drive member 84 and a grounded member 90 which may be fixed to the housing 46. The rotating member 88 is engaged by the grounded member 90, as is customary, when low speed differential operation is selected. The high-speed clutch assembly 92 includes a rotating member 94 connected to the drive member 84 and a driven member 96 attached to the drive member 30 of the motor. When the HI speed of the differential assembly 12c is selected, the rotating member 94 engages with the driven member 96 and the member 84 is driven by the drive member 30 of the motor 22.

Referring to FIG. 3B, shown is a third embodiment of a multi-speed unit 83c, which provides for three operational speeds (DIRECT DRIVE, LOW and OVERDRIVE). The multi-speed unit 83c differs from the multi-speed unit 83b (FIG. 3A) in that a planetary assembly 99 is included and is positioned between the LOW and DIRECT DRIVE speed clutch assemblies 86, 92 to provide a speed greater than the DIRECT DRIVE speed selection. The planetary assembly 99 includes a sun gear 100 attached to the rotating member 94, a planet gear set 102 and a ring gear 106. A carrier 104 supporting the planet gear set 102 of the planetary assembly 99, is connected to the drive member 30 through member 96 of the high-speed clutch assembly 92. An overdrive speed clutch assembly 98, which is engagable to operate the planetary assembly 99, includes a rotating member 108 and a grounded member 110. In operation, activation of the clutch assembly 98 causes grounded member 110 and rotating member 108 to engage, which, in turn, causes ring gear 106 to become grounded with the housing 46. Consequently, the drive member 30 of the motor 22 drives the drive member 84 at an OVERDRIVE speed which is generally greater than the DIRECT DRIVE speed.

Referring to FIG. 4, shown is a fourth embodiment of a differential assembly 12d and differs from the second embodiment differential assembly 12b (FIG. 2) in that a differential lock assembly 112 is provided between the first planetary assembly 18 and the motor 22. The differential lock assembly 112 includes a planetary assembly 114 and a clutch assembly 126. The planetary assembly 114 includes a sun gear 116, a planet gear set 118, a ring gear 122 and a carrier 120. The sun gear 116 is attached to the drive member 30. Hence, the motor 22 is drivably engaged with both of the sun gear 116, of the differential lock assembly 112, and the ring gear 32 of the first planetary assembly 18. The carrier 120 of the differential lock assembly 112 is directly engaged with the output member 39 (and the output assembly 11) through member 124 (FIG. 1).

Referring again to FIG. 4, the planetary assembly 114 includes a ratio of $e_3$ equal to the number of teeth of the ring gear 122 over the number of teeth of the sun gear 116. The angular speed relationship between for the differential assembly 12d may be expressed as:

$$\omega_{sun\ (116)} = 3\omega_{to\ output\ (120)} - 2\omega_{ring\ (122)}$$

As a result, some exemplary values for the ratios $e_1$, $e_2$ and $e_3$ and the corresponding reduction are as follows:

| $e_1$ | $e_2$ | $e_3$ | Reduction |
| --- | --- | --- | --- |
| 2 | 3 | 2 | 3.0 |
| 2.5 | 3.5 | 1.8 | 2.8 |
| 3 | 4 | 1.67 | 2.67 |
| 3.5 | 4.5 | 1.57 | 2.57 |

The differential lock clutch assembly 126 includes a rotating member 128 and a grounded member 130 which is fixed to the housing 46. When the clutch assembly 126 is engaged the rotating member 128 is retained by the grounded member 130 and, consequently, the ring gear 122 is grounded to the housing 46. As a result, the carrier 120 is urged to rotate and drive the output member 39 which accordingly is in driving engagement with the final drive 14 and respective wheel 16 (FIG. 1).

Figure 7:
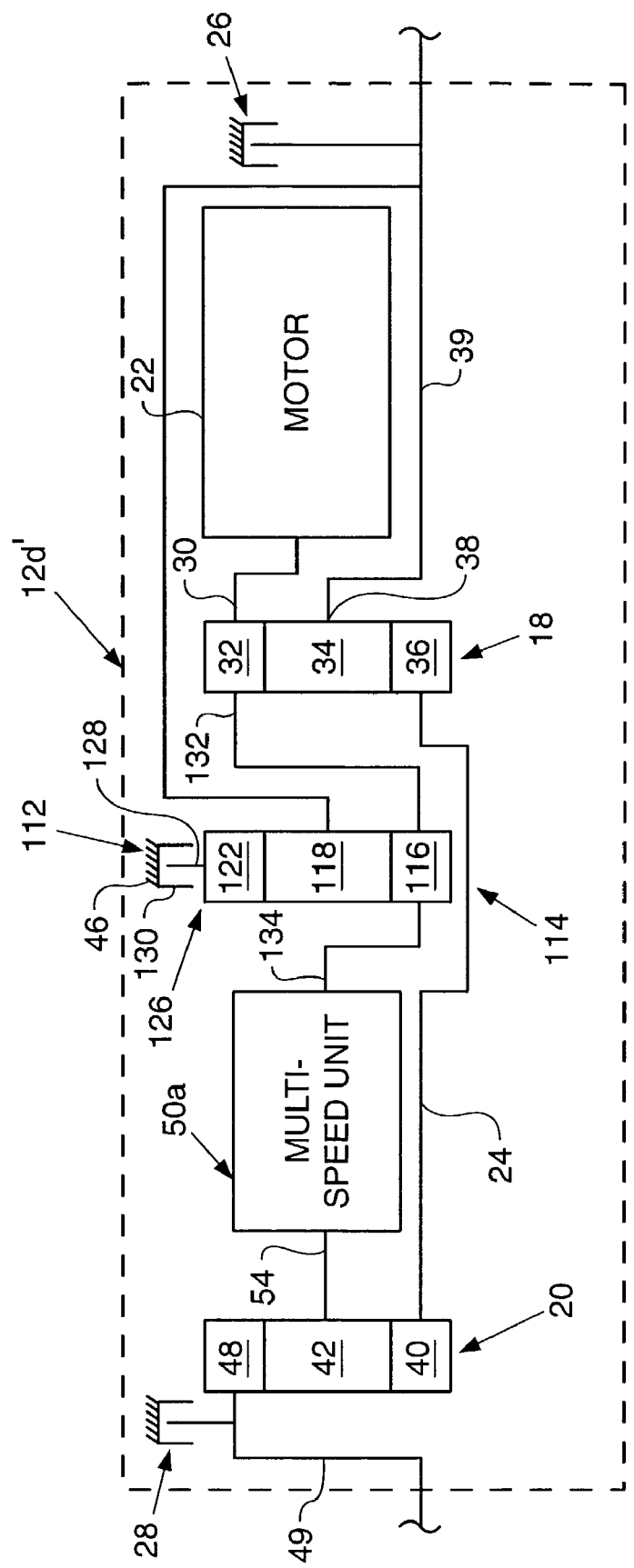
FIG. 7 is a schematic and diagrammatic view of a modified form of the differential assembly shown in FIG. 4.

Referring to FIG. 7, a modified embodiment of the differential assembly 12d is shown. The differential assembly 12d' differs from the differential assembly 12d, inter alia, in that the motor 22 is positioned outside of the first planetary assembly 18. Moreover, rather than the motor 22 being connected to the multi-speed unit 50a, the sun 116 of planetary assembly 114 and the ring 32 of the first planetary assembly 18, as is depicted in FIG. 4, the differential assembly 12d' provides a connection between the motor 22 and the ring gear 32 through the drive member 30. In turn the ring gear 32 is in driving engagement with the sun gear 116 of the planetary assembly 114 through a member 132 and the sun gear 116 is in driving engagement with the multi-speed unit 50a through a member 134. It is contemplated that the motor 22 may be concentrically positioned about the output member 39 or the motor 22 may be offset, having an axis of rotation being parallel and offset relative to the output member 39.

Figure 5:
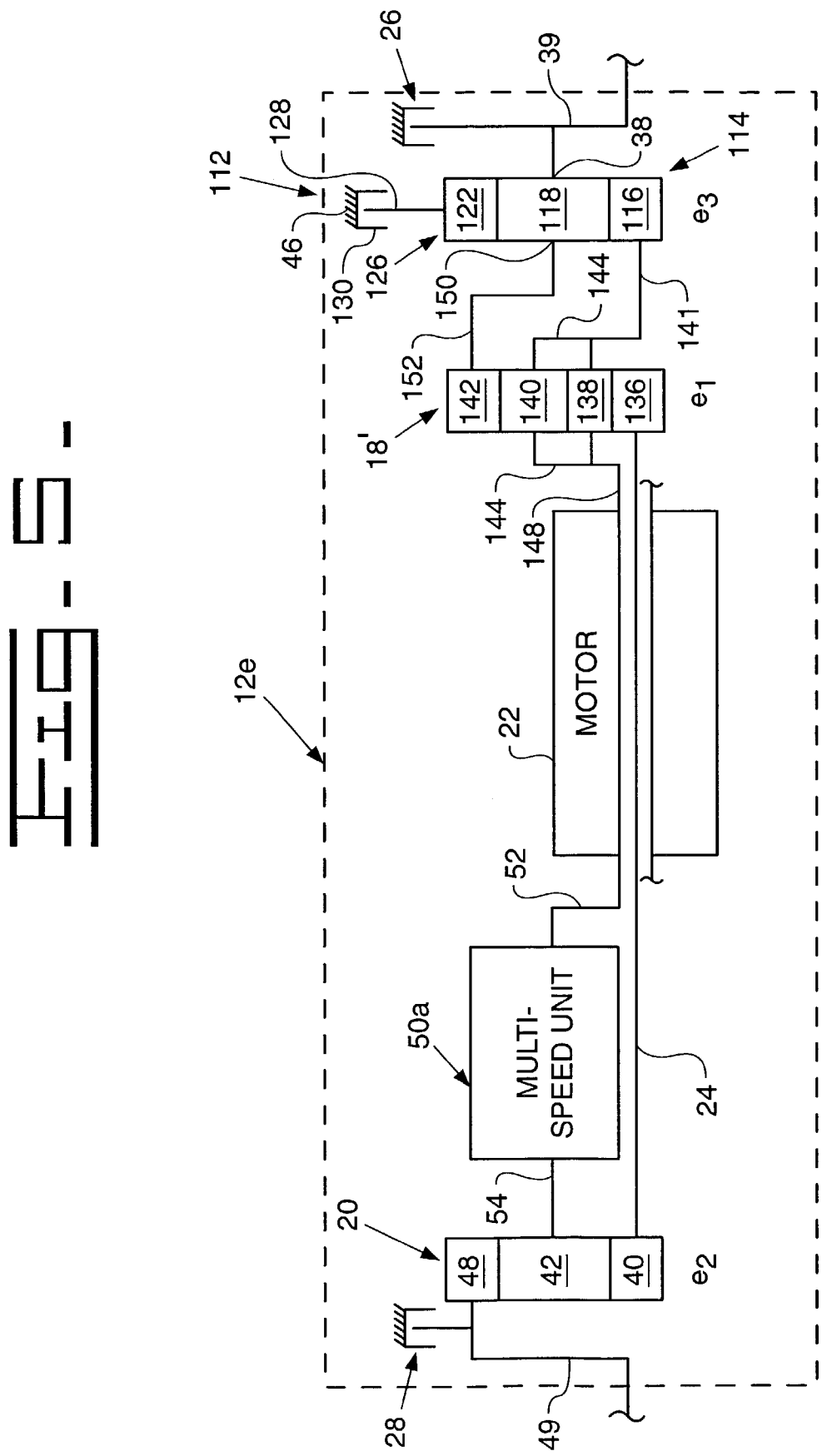
FIG. 5 is a schematic and diagrammatic view of a fifth embodiment of a differential assembly according to the present invention showing a differential lock assembly.

Referring to FIG. 5, shown is a fifth embodiment of a differential assembly 12e and differs from the fourth embodiment differential assembly 12d (FIG. 4), inter alia, in that the differential lock assembly 112 and the corresponding planetary assembly 114 have been positioned outside of the first planetary assembly 18'. Moreover, the differential 12e includes a modified first planetary 18' to include multiple planet gear sets. The first planetary assembly 18' includes a sun gear 136, an inner planet set 138, an outer planet set 140 and a ring gear 142. A first carrier 144 rotatably supports the planet sets 138, 140 and is connected to the sun gear 116 of the planetary assembly 114 through a connecting member 141. A carrier 144 is connected to a drive member 148 of the motor 22. It may be seen that the ring gear 142 of the first planetary assembly 18' is connected to a planetary carrier 150, rotatably supporting the planetary set 118, through a connecting member 152. The carrier 38, in cooperation with the carrier 150, co-supports the planetary set 118 and is directly engaged with the output member 39 which drives the output assembly 11 (FIG. 1).

Notably, the equation noted above corresponding to the angular speed relationship for the differential assembly 12d, also governs the angular speed relationship for the differential assembly 12e. In an exemplary embodiment, $e_1=-3$, $e_2=3$ and $e_3=2$.

INDUSTRIAL APPLICABILITY

Referring to FIG. 1, the operation of the differential assembly 12a will be described. The motor 22 drives the ring gear 32 of the first planetary assembly 18 and, in turn, the ring gear 32 drives both the planet gear set 34 and the reaction member 24. The torque generated by the motor 22 is distributed to the output assembly 11 through the first planetary assembly 18 and to the output assembly 13 through the other planetary assembly 20. As is customary the torque to both the output assemblies 11, 13 is substantially the same and is independent of the speed of the corresponding output assemblies.

In an exemplary embodiment wherein each output assembly 11, 13 includes the respective final drive 14, 15, the reduction ratio of the final drives may be 5:1 and the first and second planetary assemblies 18, 20 include respective e values of $e_1=2$, and $e_2=3$, for example. The total reduction, from motor 22 to wheels 16, 17, may be approximately 15:1. Accordingly, an exemplary differential assembly may include a motor speed of 1875 RPM and an associated wheel speed of 125 RPM, for example.

Referring to FIGS. 2, 3 and 6 the differential assemblies 12b, 12c and 12b' include multi-speed units 50a or 83a such that the differential assemblies may be operable through a range of speeds rather than a single speed or a narrow speed range.

In this example, the multi-speed unit 50a provides a maximum reduction in speed when the output member 54 is held stationary respective of the differential housing 46. If the multi-speed unit has a reverse gear and drives 54 in the opposite direction of 52 but at a slower speed a ratio greater than 3:1 can be achieved. The maximum speed reduction is provided by the reduction ratio of the first and second planetary assemblies 18, 20 and may be 3:1, for example, with $e_1=2$ and $e_2=3$. Generally, both of the first and second planetary assemblies co-actively and systematically operate to provide the desired reduction and substantially equal output torques measured at the output assemblies 11, 13 (FIG. 1).

Referring to FIGS. 2 and 6, when the multi-speed unit 50a is urged to transfer torque between the drive member 52 and the output member 54, then the effect of the reduction provided by the first and second planetary assemblies 18 and 20 is lessened. For example, if the multi-speed unit 50a causes the drive member 52 of the motor to directly drive the output member 54, then the first and second planetary assemblies 18, 20 may be operative to provide a 1:1 reduction or "direct drive" from the reaction member 24 to the output assemblies 11, 13 (FIG. 1).

Referring to FIGS. 2A and 2B, the operation of multi-speed units 50b and 50c provide two and three speed capabilities, respectively. The two speed multi-speed unit 50b is operative to sustain the 3:1 reduction of the first and second planetary assemblies 18, 20 when in LO speed. In HI speed, the rotating clutch 62 provides direct drive between the drive and output members 52, 54 for a 1:1 reduction ratio for the first and second planetary assemblies 18 and 20. The three speed planetary assembly 50c (FIG. 2B) is substantially identical to that of the two speed multi-speed unit 50b (FIG. 2A) except that an additional and intermediate speed between HI and LOW is provided by the addition of the planetary assembly 68.

Referring to FIG. 3, similar to the multi-speed unit 50a (FIG. 2), multi-speed unit 83a provides a maximum reduction in speed when the drive member 84 is held stationary respective of the differential housing 46. A speed reduction of 1.5 is provided when the ratios $e_1$ and $e_2$, for the first and second planetary assemblies 18, 20, are 2 and 3, respectively. In contrast, when the multi-speed unit 83a is urged to transfer torque between the drive member 30 and the drive member 84, then the effect of the reduction provided by the first and second planetary assemblies is lessened. For example, if the multi-speed unit 83a causes the drive member 30 of the motor 22 to directly drive the drive member 84 then the first and second planetary assemblies 18 and 20 may be operative to provide a 1:1 reduction or "direct drive" from the carrier 38 to the final drive assemblies 14 and 15 of respective output assemblies 11 and 13 (FIG. 1).

Referring to FIGS. 3A and 3B, the multi-speed units 83b and 83c provide two and three speed capabilities, respectively. The two speed multi-speed unit 83b is operative to create the 1.5:1 reduction from the first and second planetary assemblies 18 and 20 when in LO speed. In HI speed, the rotating clutch 98 provides direct drive between the drive members 30, 84 for a 1:1 reduction ratio for the first and second planetary assemblies 18 and 20. The three speed planetary assembly 83c is substantially identical to that of the two speed multi-speed unit 83b except that an additional speed (e.g., OVERDRIVE) greater than the DIRECT DRIVE speed is provided by the addition of the planetary assembly 99.

Referring to FIGS. 4 and 7, in operation the differential assemblies 12d, 12d' include the differential lock assembly 126 which, when activated, augments the differential function of the co-acting first and second planetary assemblies. During specific maneuvering of the machine 10 (FIG. 1), traction loss, which may be generally transmitted through a tire (not shown) to the respective wheel mounted therewith, of either wheel may result in inefficient work performed by the machine. For example, such maneuvering may occur when an operator positions an earthmoving machine to load, and thereafter, transport earth, rock, etc. Notably, both drive wheels 16, 17 (FIG. 1) are advantageously engaged with the ground so that the positioned machine orientation is not compromised.

The differential lock assembly 112 may be activated by engaging the clutch assembly 126 which causes grounding of the ring gear 122 with the housing 46. Once the ring gear 122 is grounded, the first and second planetary assemblies 18 and 20 are forced to rotate their respective output member 39, 49 at substantially the same speed and to do so independent of torque to these output members. In other words, the differential communication between the first and second planetaries is "overridden" to cause similar rotational speed between the output members 39, 49. This is typically desirable if a machine exhibits little or no machine speed; hence the differential function is no longer a priority. Consequently, it is envisioned that the differential lock assembly 112 may be activated when the machine falls below a threshold value such as 5 MPH, for example. Above this threshold speed the differential lock assembly 112 may be disengaged to cause the differential action between output assemblies to be re-established.

Referring to FIG. 5, in operation the differential assembly 12e includes a negative planetary assembly ($e_1$) which includes inner and outer planetary sets 138, 140 rotatably supported by a carrier 144. The carrier 144 is driven by the motor 22 in response to the drive member 148 being urged to rotate.

When it becomes desirable to override the differential to decrease or prevent slippage of the output assemblies 11, 13, the differential lock 126 is engaged causing the grounding of the ring gear 122 of the planetary assembly 114 with the housing 46. In turn, the motor 22 drives the carrier 144 and, as a result, the rotation of the sun gears 116, 136 are directly communicated to corresponding output members 39 and 49 respectively. Consequently, the speed of the output members 39 and 49 is similar during engagement of the differential lock 126.

It will be apparent to those skilled in the art that various modifications and variations can be made in the differential system of the present invention without departing from the scope or spirit of the invention. Other embodiments of the invention will be apparent to those skilled in the art form consideration of the specification and practice of the invention disclosed herein. It is intended that the specification and examples be considered as exemplary only, with the true scope and spirit of the invention being indicated by the following claims and their equivalents.

What is claimed is:

1. A differential assembly comprising;
an electrically operated input device;
a first planetary assembly in direct driving engagement with said input device, said first planetary assembly directly driving a first output assembly;
a second planetary assembly in direct driving engagement with said first planetary assembly, said second planetary assembly directly driving a second output assembly;
wherein said input device, said first planetary assembly, and said second planetary assembly are drivingly connected in series, one after the other, to provide substantially the same torque to said first and second output assemblies,
wherein said one of said first and second planetary assemblies includes a reduction ratio value one greater than the other of said first and said second planetary assemblies.

2. A differential assembly comprising;
an electrically operated input device;
a first planetary assembly in direct driving engagement with said input device, said first planetary assembly directly driving a first output assembly;
a second planetary assembly in direct driving engagement with said first planetary assembly, said second planetary assembly directly driving a second output assembly;
at least one brake assembly operable to reduce relative rotation of at least one of said first or said second output assemblies in response to a substantial rotational speed difference between said first and said second output assemblies,
wherein said input device, said first planetary assembly, and said second planetary assembly are drivingly connected in series, one after the other, to provide substantially the same torque to said first and second output assemblies.

3. The differential assembly of claim 2, wherein a first brake assembly is disposed between said first output assembly and said first planetary assembly and a second brake assembly is disposed between said second output assembly and said second planetary assembly, said first and said second brake assemblies being operable to reduce relative rotation of at least one of said first or said second output assemblies.

4. A differential assembly comprising:
an electrically operated input device;
a first planetary assembly in direct driving engagement with said input device, said first planetary assembly directly driving a first output assembly;
a second planetary assembly in direct driving engagement with said first planetary assembly, said second planetary assembly directly driving a second output assembly;
wherein said input device, said first planetary assembly, and said second planetary assembly are drivingly connected in series, one after the other, to provide substantially the same torque to said first and second output assemblies,
wherein at least one of said first output assembly or said second output assembly includes a final drive assembly.

5. A differential assembly comprising:
an electrically operated input device;
a first planetary assembly in direct driving engagement with said input device, said first planetary assembly directly driving a first output assembly;
a second planetary assembly in direct driving engagement with said first planetary assembly, said second planetary assembly directly driving a second output assembly;
wherein said input device, said first planetary assembly, and said second planetary assembly are drivingly connected in series, one after the other, to provide substantially the same torque to said first and second output assemblies,
wherein at least one of said first output assembly or said second output assembly includes a continuous track assembly.

6. A differential assembly comprising:
an electrically operated input device;
a first planetary assembly in direct driving engagement with said input device, said first planetary assembly directly driving a first output assembly;
a second planetary assembly in direct driving engagement with said first planetary assembly, said second planetary assembly directly driving a second output assembly;
wherein said input device, said first planetary assembly, and said second planetary assembly are drivingly connected in series, one after the other, to provide substantially the same torque to said first and second output assemblies,
wherein each of the first and second planetary assemblies include components comprising a sun gear, a planet gear set, a ring gear, and a carrier,
wherein a hollow drive member is connected to the input device and drives the first planetary assembly,
wherein the hollow drive member drives the ring gear of the first planetary assembly.

7. A differential assembly comprising:
an electrically operated input device;
a first planetary assembly in direct driving engagement with said input device, said first planetary assembly directly driving a first output assembly;
a second planetary assembly in direct driving engagement with said first planetary assembly, said second planetary assembly directly driving a second output assembly;
wherein said input device, said first planetary assembly, and said second planetary assembly are drivingly connected in series, one after the other, to provide substantially the same torque to said first and second output assemblies,
wherein each of the first and second planetary assemblies include components comprising a sun gear, a planet gear set, a ring gear, and a carrier,
wherein a drive member is connected to the input device, the drive member driving the ring gear of the first planetary assembly which in turn drives a reaction member connected to the sun gears of the first and second planetary assemblies.

8. A differential assembly, comprising:
an electrically operated input device;
no more than two planetary assemblies;
the first planetary assembly in driving engagement with the input device, the first planetary assembly being drivingly connected to a first output assembly;
a second planetary assembly in driving engagement with the first planetary assembly such that an output of the first planetary assembly delivers an input to the second planetary assembly, the second planetary assembly being drivingly connected to a second output assembly;
wherein the input device, the first planetary assembly, and the second planetary assembly are drivingly connected in series, one after the other, to provide substantially the same torque to said first and second output assemblies.

9. The differential assembly of claim 8, wherein the input device is disposed between the first and the second planetary assemblies.

10. The differential assembly of claim 9, wherein the first and the second planetary assemblies are in driving engagement through a reaction member.

11. The differential assembly of claim 10, wherein the reaction member is extended through the input device.

12. The differential assembly of claim 8, wherein each of the first and second planetary assemblies include components comprising a sun gear, a planet gear set, a ring gear, and a carrier.

13. The differential assembly of claim 12, wherein the sun gears of the first and second planetary assemblies are in driving engagement through a reaction member.

14. The differential assembly of claim 12, wherein different components of the first and second planetary assemblies drive the first and second output assemblies.

15. The differential assembly of claim 12, wherein the carrier of the first planetary assembly drives the first output assembly and the ring gear of the second planetary assembly drives the second output assembly.

16. The differential assembly of claim 12, wherein the carrier of the second planetary assembly is grounded through attachment to a housing of the differential assembly.

17. The differential assembly of claim 12, wherein a drive member is connected to the input device, the drive member driving the ring gear of the first planetary assembly which in turn drives a reaction member connected to the sun gears of the first and second planetary assemblies.

18. The differential assembly of claim 8, wherein a hollow drive member is connected to the input device and drives the first planetary assembly.

19. The differential assembly of claim 18, wherein the hollow drive member drives a ring gear of the first planetary assembly.

20. The differential assembly of claim 8, wherein the first and the second planetary assemblies include axes of rotation substantially aligned with an axis of rotation of the input device.

21. The differential assembly of claim 20, wherein the first and second planetary assemblies are in driving engagement through a reaction member and the reaction member is extended through the input device.

22. The differential assembly of claim 8, wherein one of the first and second planetary assemblies includes a reduction ratio value greater than the other of the first and the second planetary assemblies.

23. The differential assembly of claim 8, wherein at least one of an axis of rotation of the first planetary assembly or an axis of rotation of the second planetary assembly is coincident with an axis of rotation of the input device.

* * * * *